US011495861B2

(12) United States Patent
Wang et al.

(10) Patent No.: US 11,495,861 B2
(45) Date of Patent: *Nov. 8, 2022

(54) CASING FOR BATTERY PACK AND BATTERY PACK

(71) Applicant: Contemporary Amperex Technology Co., Limited, Ningde (CN)

(72) Inventors: Lei Wang, Ningde (CN); Linggang Zhou, Ningde (CN); Xingdi Chen, Ningde (CN); Peng Wang, Ningde (CN); Derong Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/358,037

(22) Filed: Jun. 25, 2021

(65) Prior Publication Data

US 2021/0320357 A1 Oct. 14, 2021

Related U.S. Application Data

(63) Continuation of application No. 16/427,934, filed on May 31, 2019, now Pat. No. 11,101,519.

(30) Foreign Application Priority Data

Nov. 15, 2018 (CN) .......................... 201811362042.4

(51) Int. Cl.
*H01M 50/20* (2021.01)
*H01M 10/613* (2014.01)
(Continued)

(52) U.S. Cl.
CPC .............. *H01M 50/20* (2021.01); *B60K 1/04* (2013.01); *H01M 10/613* (2015.04);
(Continued)

(58) Field of Classification Search
CPC .. H01M 50/20; H01M 10/613; H01M 10/625; H01M 10/6554; H01M 10/6556; H01M 2220/20; H01M 50/24; B60K 1/04
See application file for complete search history.

(56) References Cited

U.S. PATENT DOCUMENTS 5,278,002 A 1/1994 Hiers et al.
2012/0312614 A1* 12/2012 Fujiwara ........... H01M 10/6554
180/68.5
(Continued)

FOREIGN PATENT DOCUMENTS

CN 1996641 A 7/2007
CN 101510593 A 8/2009
(Continued)

OTHER PUBLICATIONS

The International Search Report for PCT/CN2019/118664, dated Jan. 23, 2020, 11 pages.
(Continued)

*Primary Examiner* — Stewart A Fraser
(74) *Attorney, Agent, or Firm* — East IP P.C.

(57) ABSTRACT

The present disclosure relates to a casing for a battery pack and a battery pack. The casing has a receiving space and an opening in communication with the receiving space, the receiving space is formed by a wall portion of the casing, and the wall portion is formed from two or more stacked base plates, between which a plurality of cavities are formed. By forming a plurality of cavities in the wall portion, the casing for a battery pack provided by the present disclosure not only can improve the bearing capacity and the impact resistance of the casing, but also can achieve a thermal management of the battery assembly by filling the plurality of cavities with a phase change material or cooling liquid, which can further improve the mechanical property (Continued)

of the casing with a relatively light weight and relatively high reliability.

20 Claims, 6 Drawing Sheets

(51) Int. Cl.
  *H01M 10/625* (2014.01)
  *H01M 10/6554* (2014.01)
  *H01M 10/6556* (2014.01)
  *B60K 1/04* (2019.01)

(52) U.S. Cl.
  CPC ..... *H01M 10/625* (2015.04); *H01M 10/6554* (2015.04); *H01M 10/6556* (2015.04); *H01M 2220/20* (2013.01)

(56) References Cited

U.S. PATENT DOCUMENTS

| | | |
|---|---|---|
| 2016/0036104 A1 | 2/2016 | Kenney et al. |
| 2016/0049705 A1 | 2/2016 | Mahe et al. |
| 2016/0372731 A1 | 12/2016 | Lee et al. |
| 2017/0179555 A1 | 6/2017 | Foerster et al. |
| 2018/0154754 A1 | 6/2018 | Rowley et al. |
| 2018/0261811 A1 | 9/2018 | Kellner et al. |
| 2020/0161602 A1 | 5/2020 | Wang et al. |
| 2020/0161616 A1 | 5/2020 | Wang et al. |

FOREIGN PATENT DOCUMENTS

| | | |
|---|---|---|
| CN | 201378601 Y | 1/2010 |
| CN | 102820439 A | 12/2012 |
| CN | 103325964 A | 9/2013 |
| CN | 106898711 A | 6/2017 |
| CN | 107482279 A | 12/2017 |
| CN | 206834301 U | 1/2018 |
| CN | 108666704 A | 10/2018 |
| CN | 208045561 U | 11/2018 |
| DE | 2635427 A1 | 2/1978 |
| DE | 102012012663 A | 12/2013 |
| DE | 102016222550 A1 | 5/2018 |
| EP | 3343669 A1 | 7/2018 |
| EP | 3429023 A1 | 1/2019 |
| EP | 3508368 A1 | 7/2019 |
| JP | 2006012847 A | 1/2006 |
| JP | 2011238457 A | 11/2011 |
| JP | 2012256468 A | 12/2012 |
| JP | 2014143094 A | 8/2014 |
| JP | 2016096082 A | 5/2016 |
| JP | 2017112032 A | 6/2017 |
| JP | 2017534143 A | 11/2017 |
| JP | 2019531955 A | 11/2019 |
| WO | 2013073432 A1 | 5/2013 |
| WO | 2014061109 A1 | 4/2014 |
| WO | 2017177831 A1 | 10/2017 |
| WO | 2018040901 A1 | 3/2018 |

OTHER PUBLICATIONS

The extended European Search Report for 19179934.5, dated Jan. 20, 2020, 9 pages.
The First Office Action for Japanese Application No. 2019-157847, dated Sep. 1, 2020, 23 pages.
The Decision of Refusal for Japanese Application No. 2019-157847, dated Apr. 13, 2021, 8 pages.
The First Office Action for European Application No. 19179418.9, dated Jul. 31, 2020, 5 pages.
The Second Office Action for European Application No. 19179934.5, dated Dec. 10, 2020, 5 pages.
The extended European Search Report for 19179418.9, dated Jan. 8, 2020, 8 pages.
The First Office Action for European Application No. 19179934.5, dated Jul. 21, 2020, 5 pages.
The Non-Final Office Action for U.S. Appl. No. 17/111,126, dated Feb. 1, 2021, 26 pages.
The Advisory Action for U.S. Appl. No. 16/433,680, dated Dec. 7, 2021, 7 pages.
The Non-Final Office Action for U.S. Appl. No. 16/427,934, dated Feb. 2, 2021, 14 pages.
The Final Rejection for U.S. Appl. No. 16/433,680, dated Sep. 20, 2021, 12 pages.
The Non-Final Rejection for U.S. Appl. No. 16/433,680, dated Jun. 7, 2021, 9 pages.

* cited by examiner

CASING FOR BATTERY PACK AND BATTERY PACK

CROSS REFERENCE TO RELATED APPLICATION

This application is a continuation of U.S. patent application Ser. No. 16/427,934, filed on May 31, 2019, which claims priority to Chinese Patent Application No. 201811362042.4, filed on Nov. 15, 2018, both of which are hereby incorporated by reference in their entireties.

TECHNICAL FIELD

The present disclosure relates to a technical filed of power battery, and particularly to a casing for a battery pack and a battery pack.

BACKGROUND

With the rapid development of the electric vehicle industry, the demand for power batteries is increasing, and the performance requirements of power batteries are also increasing. As a core component of the electric vehicle, safety, endurance and charging efficiency of the power battery system directly affect the vehicle performance and service life of the electric vehicle.

In the prior art, the casing of the power batteries is usually made of a sheet metal member or a cast aluminum member because it needs to bear the weight of the batteries. However, during the running of the vehicle, the batteries will be subjected to various external impacts, and the casing will directly transmit the external impact force to the batteries when subjected to the external impacts, which may bring wear and rupture to the batteries, in the long run, and a safety accident may occur.

SUMMARY

The object of the embodiments of the present disclosure is to provide a casing for a battery pack and a battery pack, wherein the casing has good bearing capacity and impact resistance.

On one aspect, the embodiments of the present disclosure provide a casing for a battery pack, wherein the casing has a receiving space and an opening in communication with the receiving space, the receiving space is formed by a wall portion of the casing, and the wall portion is formed from two or more stacked base plates, between which a plurality of cavities are formed.

According to one aspect of the embodiments of the present disclosure, the base plates comprises a first base plate and a second base plate, and the cavity is formed by an outwardly projecting convex wall of the second base plate and a flat wall of the first base plate corresponding to the convex wall.

According to one aspect of the embodiments of the present disclosure, the first base plate and the second base plate are stacked in a direction from the receiving space to an exterior of the casing.

According to one aspect of the embodiments of the present disclosure, the convex wall comprises a top portion and a side portion connected to the top portion, wherein the top portion is planar or curved, and there is a smooth transition between the top portion and the side portion.

According to one aspect of the embodiments of the present disclosure, the wall portion has a wall thickness tin a range of 1 mm≤t≤6 mm, a ratio of a wall thickness t1 of the flat wall to a wall thickness t2 of the convex wall is in a range of 0.5≤t2/t1≤1, the cavity has a height h in a range of h≤5×t1, and a ratio of the height h to a width W of the cavity is in a range of h/W≤0.5.

According to one aspect of the embodiments of the present disclosure, the wall portion comprises a bottom wall and side walls surrounding the bottom wall on a peripheral side of the bottom wall, and the bottom wall and the side walls are integrally formed.

According to one aspect of the embodiments of the present disclosure, a minimum distance d from an intersection line between two adjacent side walls to the cavity is equal to or greater than 25 mm.

According to one aspect of the embodiments of the present disclosure, the plurality of cavities are in communication with each other to form a flow passage.

According to one aspect of the embodiments of the present disclosure, the casing is provided with an inlet pipe and an outlet pipe on the side wall, wherein the inlet pipe and the outlet pipe are respectively in communication with two ends of the flow passage, and are located at a same side of the side wall.

According to one aspect of the embodiments of the present disclosure, a material of the base plate has a tensile strength σ≥100 MPa, and has an elongation at break ≥12% and preferably ≥20%.

According to one aspect of the embodiments of the present disclosure, the cavities are formed between the first base plate and the second base plate by a blow molding process.

On a further aspect, the embodiments of the present disclosure further provide a battery pack, comprising: a battery assembly; a casing according to any one of the above embodiments; and a cover closing the opening of the casing to form an enclosed space for accommodating the battery assembly together with the receiving space of the casing.

By forming a plurality of cavities in the wall portion, the casing for a battery pack provided by the embodiments of the present disclosure not only can improve the bearing capacity and the impact resistance of the casing, but also can achieve a thermal management of the battery assembly by filling the plurality of cavities with a phase change material or cooling liquid, which can further improve the impact resistance and mechanical property of the casing with a simple structure, light weight and high reliability. Further, the battery pack provided by the embodiments of the present disclosure uses the casing as described above, which can improve the safety of the battery pack.

BRIEF DESCRIPTION OF THE DRAWINGS

Features, advantages, and technical effects of exemplary embodiments of the present disclosure will be described below with reference to accompanying drawings.

FIG. 11 is an enlarged schematic view showing a structure of the region F in the casing shown in FIG. 8, wherein:

Figure 1:
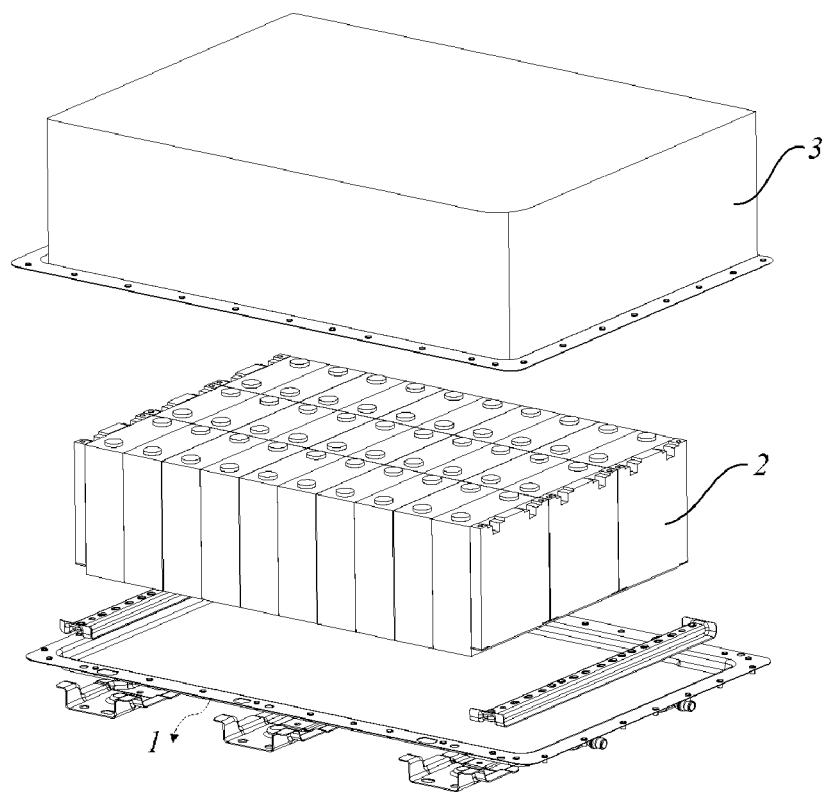
FIG. 1 is a schematic view showing a structure of a battery pack according to an embodiment of the present disclosure.

1—casing;
10—receiving space;
11—wall portion;
111—bottom wall;
112—side wall;
113—spherical corner;
12—brim portion;
13—inlet pipe;
131—mounting step;
132—welding step;
14—outlet pipe;
15—support member;
16—protective member;
20—cavity;
21—first base plate;
211—flat wall;
22—second base plate;
221—convex wall;
2211—top portion;
2212—side portion;
30—island;
2—battery assembly;
3—cover;
R—flow passage;
R1—inflow confluence region; and
R2—outflow confluence region.

In the drawings, the same members are denoted by the same reference numerals. The drawings are not drawn to scale.

DETAILED DESCRIPTION

Features and exemplary embodiments of various aspects of the present disclosure will be described in detail below. In the following detailed description, numerous specific details are set forth to provide a full understanding of the present invention. However, it will be apparent to the person skilled in the art that the present invention may be practiced without some of the details. The following description of the embodiments is merely provided to provide a better understanding of the invention by showing examples of the invention. In the figures and the following description, at least some of the known structures and techniques are not shown to avoid unnecessarily obscuring the present invention; and, for clarity, the size of a portion of the structure may be exaggerated. Furthermore, the features, structures, or characteristics described hereinafter may be combined in any suitable manner into one or more embodiments.

The orientations in the following description refers to the directions as shown in the figures, and are not intended to define the specific structure of the present invention. In the description of the present disclosure, it should be noted that, unless otherwise stated, the terms "installation", "connected to", and "connected with" are to be understood broadly, and may be, for example, a fixed connection, a disassemble connection, or an integral connection; they can be connected directly or indirectly through an intermediate medium. The specific meaning of the above terms in the present disclosure can be understood by the person skilled in the art according to actual circumstance. Further, the terms "first", "second", and the like are configured for descriptive purposes only and are not to be construed as indicating or implying relative importance or implying the number of indicated technical features. Therefore, the terms "first", "second", and the like may indicate or imply including at least one indicated technical features.

For better understanding the present disclosure, a casing for a battery pack and a battery pack according to the embodiments of the present disclosure will be described in detail below by reference to FIG. 1 to FIG. 11.

Figure 2:
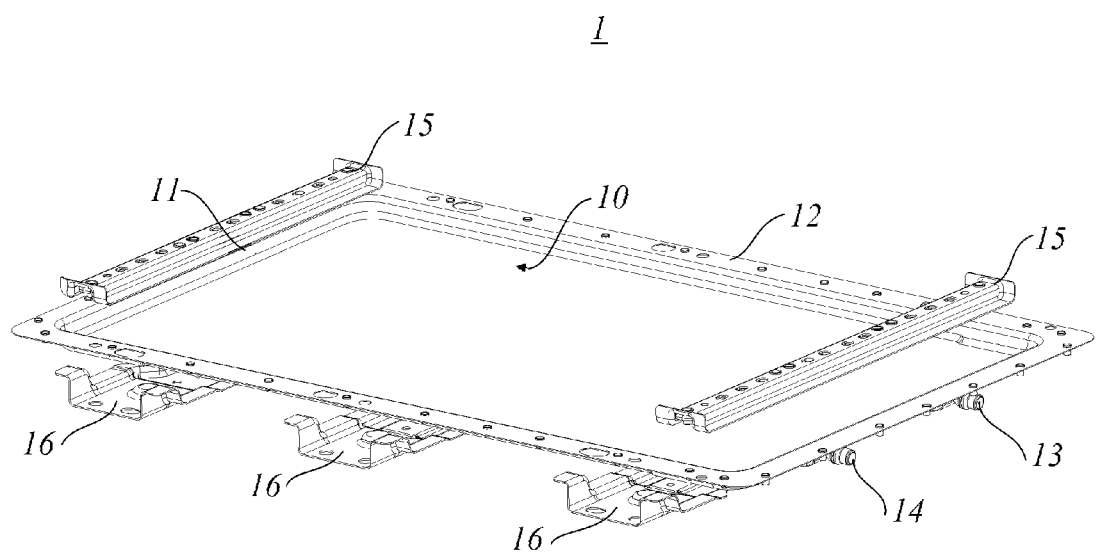
FIG. 2 is a schematic view showing a structure of a casing for a battery pack shown in FIG. 1 viewed from one angle.
Figure 3:
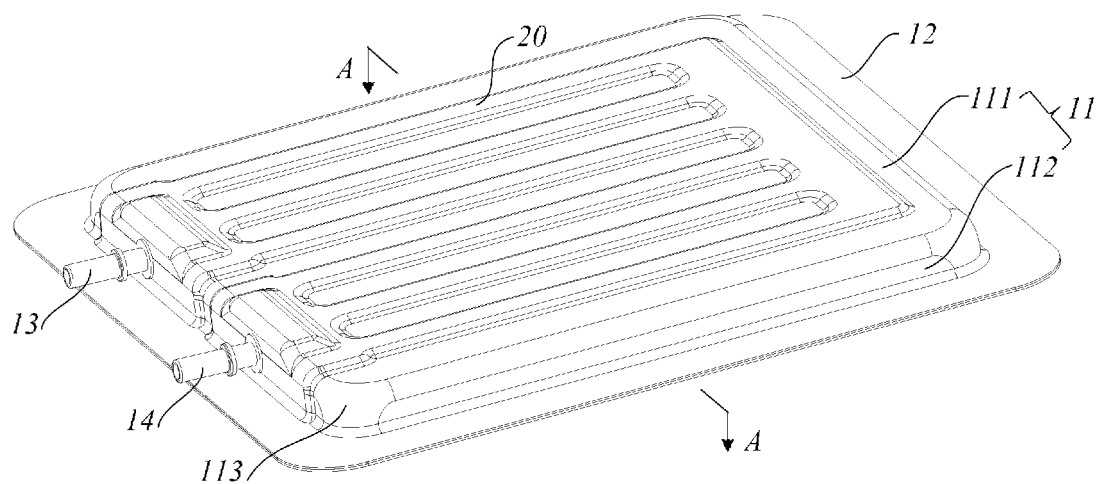
FIG. 3 is a schematic view showing the structure of the casing shown in FIG. 2 viewed from another angle.

Referring to FIG. 1, FIG. 2 and FIG. 3 together, embodiments of the present disclosure provide a battery pack comprising: a casing 1, a battery assembly 2 and a cover 3. The cover 3 and the casing 1 form an enclosed space for accommodating the battery assembly 2.

In an embodiment of the present disclosure which provides the casing 1 for a battery pack, the casing 1 has a receiving space 10 and an opening in communication with the receiving space 10, and the receiving space 10 is formed by a wall portion 11 of the casing 1. The wall portion 11 is formed by two or more stacked base plates, between which a plurality of cavities 20 are formed.

The casing 1 can be formed by pressing metal base plates. Generally, the battery assembly 2 and management system thereof in the battery pack have a weight of 200 Kg or more, and the wall portion 11 formed by pressing the metal base plates has a wall thickness t in the range of 1 mm≤t≤6 mm. If t<1 mm, the wall portion 11 of the casing 1 is too thin to bear the battery assembly 2 and other components in the battery pack, and is easily broken during use. If t>6 mm, the casing 1 occupies a too large volume, which is not conducive to increase of an energy density of the battery pack. In order to increase a structural strength of the casing 1 with a limited occupation space, a plurality of cavities 20 are formed between the two or more base plates to enhance the structural strength and bearing capacity of the casing 1.

Compared with the technical solution of providing reinforcing ribs on the wall portion 11 of the casing 1, such a configuration not only can improve a rigidity and strength of the casing 1, but also can improve a vibration and impact resistance of the casing 1 by the cavities 20. In the situation that the battery pack is subjected to an external impact, the cavities 20 can absorb and disperse part of the external impact force, thereby producing an effect of buffer and damping, and thus improving an impact resistance of the entire battery pack. Further, compared with a member with cavities formed by a cast aluminum extrusion process, such a configuration can reduce the space occupied by the casing. That's because due to the limitation of the casting process, the member with cavities formed by the casting process generally has a wall thickness greater than 3 mm, and thus a casing with an internal cavity formed by the casting process will have a wall thickness of at least 6 mm, and accordingly will occupy a large space, which is not conducive to the increase of the energy density of the battery pack.

Further, for an electric vehicle using power batteries, an operating environment temperature generally falls within a range from −30° C. to 80° C. An optimal operating environment temperature of the power batteries is in a range from 20° C. to 40° C., in which the power batteries have a best charge and discharge performance and a longest service life, and there is a risk of short circuit when charging the power batteries below 0° C. Therefore, a reasonable battery thermal management design is critical to the performance and service life of the power batteries.

For this purpose, the plurality of cavities 20 in the wall portion 11 of the casing 1 may be filled with a heat conductive material, such as but not limited to, a phase change material having a solid-liquid transition temperature or a cooling liquid, to realize the thermal management of the battery assembly 2. Compared with the prior art in which the thermal management of the battery assembly 2 is generally performed by a built-in/external water-cooling system, such a configuration is simple, occupies a small space, and does not need many pipe joints, which can reduce a risk of leakage. Preferably, the heat conductive material disposed within the cavities 20 is a liquid or flexible material. In the situation that the casing is subjected to an external impact force, the external impact force can be transmitted to the internal liquid or the flexible material by the cavities 20. Since the liquid or flexible material has a high deformation performance, the external impact force can be further absorbed, thereby further improving the impact resistance of the casing 1.

By forming a plurality of cavities 20 in the wall portion 11, the casing 1 for a battery pack provided by the embodiments of the present disclosure not only can improve the bearing capacity and impact resistance thereof, but also can realize the thermal management of the battery assembly 2 by filling the plurality of cavities 20 with the phase change material or cooling liquid, which can further improve the impact resistance and mechanical property of the casing 1, with a simple structure, light weight and high reliability.

The specific configuration of the casing 1 for a battery pack provided by the embodiments of the present disclosure will be further described in detail below with reference to the accompanying drawings.

Referring to FIG. 3, the wall portion 11 of the casing 1 includes a bottom wall 111 and side walls 112 surrounding the bottom wall 111 on a peripheral side of the bottom wall 111. Specifically, the bottom wall 111 and the side walls 112 of the casing 1 are integrally formed, to improve a sealing property of the casing 1 and avoid a seal failure between the bottom wall 111 and the side walls 112 due to the connection of the both.

Further, referring again to FIG. 1 and FIG. 2, the casing 1 includes a brim portion 12 extending from the opening of the receiving space 10 in a direction away from a peripheral side of the receiving space 10. The brim portion 12 is connected with the cover 3 to form the enclosed space for accommodating the battery assembly 2. In the present embodiment, the casing 1 can be formed by an integral structure of the bottom wall 111, the side walls 112 and the brim portion 12, to further improve the sealing property of the casing 1.

In order to ensure the structural strength of the battery pack and satisfy the bearing capacity requirements of the battery pack, the metal base plate is made of materials with a tensile strength σ≥100 Mpa, such as aluminum, magnesium, iron and alloys thereof with the tensile strength σ≥100 Mpa, which can avoid too thin part or tensile fracture of the casing caused by deformation of the base plate during the forming process. Preferably, the material of the base plate has an elongation at break ≥12%, which can ensure that the base plate has a certain amount of deformation during the process of forming the side walls 112 and the brim portion 12 of the wall portion 11, thereby ensuring the sealing property and strength of the casing 1. Since the battery pack may encounter a wading environment during use, the side walls 112 should have a height greater than 20 mm, so as to prevent external water from immersing into the battery pack.

Figure 4:
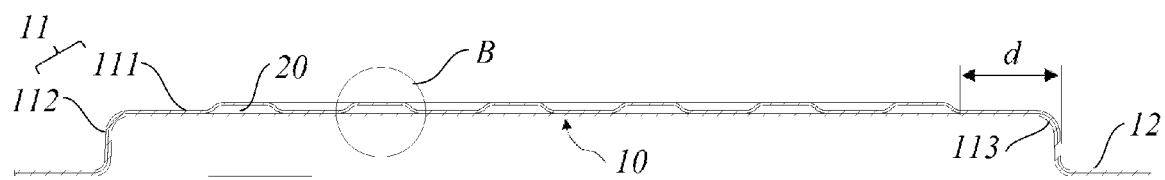
FIG. 4 is a cross-sectional view of the casing shown in FIG. 3 taken along the line A-A.

Referring to FIG. 3 and FIG. 4 together, as described above, the wall portion 11 is formed by two or more stacked base plates. Specifically, the wall portion 11 is formed by two base plates, to further reduce the weight and volume of the casing. The two base plates include a first base plate 21 and a second base plate 22. The cavity 20 may be formed by an outwardly projecting convex wall 221 of the second base plate 22 and an outwardly projecting convex wall (not shown) of the first base plate 21. Alternatively, the cavity 20 may be formed by an outwardly projecting convex wall 221 of the second base plate 22 and a flat wall 211 of the first base plate 21 corresponding to the convex wall 221. Therefore, when the battery pack is subjected to an impact, the external force acts on the convex wall 221 at first and then is transmitted to the cavity 20, the second base plate 22 and the first base plate 21 by the convex wall 221. By such multi-level dispersion of the force, the impact resistance of the casing 1 can be improved. Preferably, it is easy to arrange other components (such as support members, protective members) on the casing 1, by forming the cavity 20 by the outwardly projecting convex wall 221 of the second base plate 22 and the flat wall 211 of the first base plate 21 corresponding to the convex wall 221.

More preferably, the first base plate 21 and the second base plate 22 are stacked in a direction from the receiving space 10 to an exterior of the casing 1, and thus the flat wall 211 of the first base plate 21 is disposed close to the battery assembly 2 of the battery pack. Accordingly, a surface of the first base plate 21 close to the battery assembly 2 is approximately planar, which can increase a contact area between the first base plate 21 and the battery assembly 2. As a result, the force transmitted to the battery assembly 2 can be uniformly dispersed, which can avoid a failure of the battery assembly 2 due to a local excessive external impact force, thereby improving the safety of the battery assembly 2.

In order to ensure the sealing of the plurality of cavities 20 formed between the base plates, it is preferable that the cavities 20 are formed between the first base plate 21 and the second base plate 22 by a blow molding process. In order to avoid a rupture of the convex wall 221 of the cavity 20 during the blow molding process, it is further preferred that the material of the base plate is aluminum or an aluminum alloy having an elongation at break ≥20%. Preferably, the tensile strength σ1 of the material of the first base plate 21 is equal to or greater than the tensile strength σ2 of the material of the second base plate 22, which facilitates controlling the amount of deformation of the first base plate 21 and that of the second base plate 22 in the blow molding process, such that the relatively straight flat wall 211 can be formed in the first base plate 21.

Figure 5:
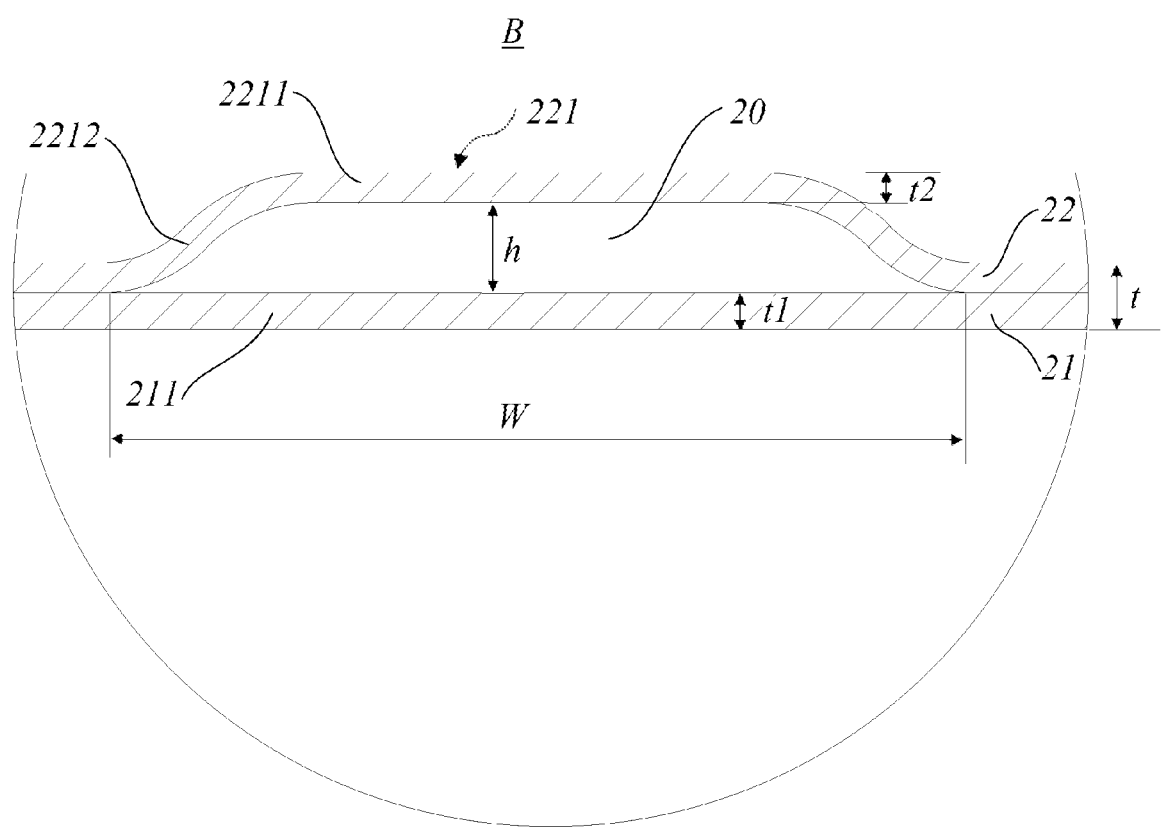
FIG. 5 is an enlarged schematic view showing a structure of the region B in the cross-sectional view shown in FIG. 4.

Referring to FIG. 5, the convex wall 221 of the second substrate 22 includes a top portion 2211 and a side portion 2212 connected to the top portion 2211. The top portion 2211 is planar or curved, and there is a smooth transition between the top portion 2211 and the side portion 2212. The top portion 2211 is preferably planar, which can increase a contact area of the convex wall 221 with an external device, facilitate uniform dispersion of the external force, and prevent the external force from acting on the highest point of the convex wall 221, causing cracking of the convex wall 221. The top portion 2211 and the side portion 2212 are smoothly transitioned, which facilitates the dispersion of the force and can increase the stability of the convex wall 221, thereby avoiding the convex wall 221 from being deformed or broken due to excessive local force.

Further, a ratio of a wall thickness t1 of the flat wall 211 to a wall thickness t2 of the convex wall 221 is in a range of $0.5 \leq t2/t1 \leq 1$. If $t2/t1 > 1$, the first base plate 21 will be easily twisted and deformed when forming the cavity 20 by the blow molding process, causing that the first base plate 21 is deformed at the surface close to the battery assembly 2 and thus cannot be attached to the battery assembly 2; If $t2/t1 < 0.5$, the convex wall 221 of the second base plate 22 will easily be broken during use since the convex wall 221 is too thin, causing a seal failure of the cavity 20. A height h of the cavity 20 is in a range of $h \leq 5 \times t1$. If the height $h > 5 \times t1$, the second base plate 22 will be easily broken in the blow molding process. A ratio of the height h to a width W of the cavity 20 is in the range of $h/W \leq 0.5$, and if the height h is too great, the first base plate 21 will be easily twisted and deformed. If the height h is too small, a fluid flow resistance will increase, which brings an adverse effect to the thermal management of the battery assembly 2.

Further, after the casing 1 is press-formed from the metal base plates, a spherical corner 113 is formed between the bottom wall 111 and two adjacent side walls 112. Since the wall thickness at the spherical corner 113 is thin, it is disadvantageous to arrange the cavity 20. Moreover, the spherical corner 113 is easily broken under the impact of an external force. In order to avoid the sealing of the cavity 20 from being affected by the damage of the spherical corner 113, a minimum distance d from an intersection line between two adjacent side walls 112 to the cavity 20 is in a range of $d \geq 25$ mm, to weaken the external force transmitted from the spherical corner 113 to the cavity 20. For example, in the case that a plurality of cavities 20 are formed in the bottom wall 111, the minimum distance d from the cavity 20 close to one side wall 112 formed in the bottom wall 111 to the side wall 112 is equal to or greater than 25 mm, to avoid a rupture of the cavity 20 and thus a seal failure due to the spherical corner 113 subjected to an external force, as shown in FIG. 4.

As described above, the wall portion 11 of the casing 1 includes a bottom wall 111 and side walls 112 surrounding on a peripheral side of the bottom wall 111. The cavity 20 may be formed in the bottom wall 111, may be formed in the side walls 112, and may be formed in both the bottom wall 111 and the side walls 112. By reasonably arranging the distribution and area of the cavities 20, the impact resistance of the battery pack can be improved. For convenience of description, the embodiments of the present disclosure are described by taking the cavity 20 formed in the bottom wall 111 as an example.

Figure 6:
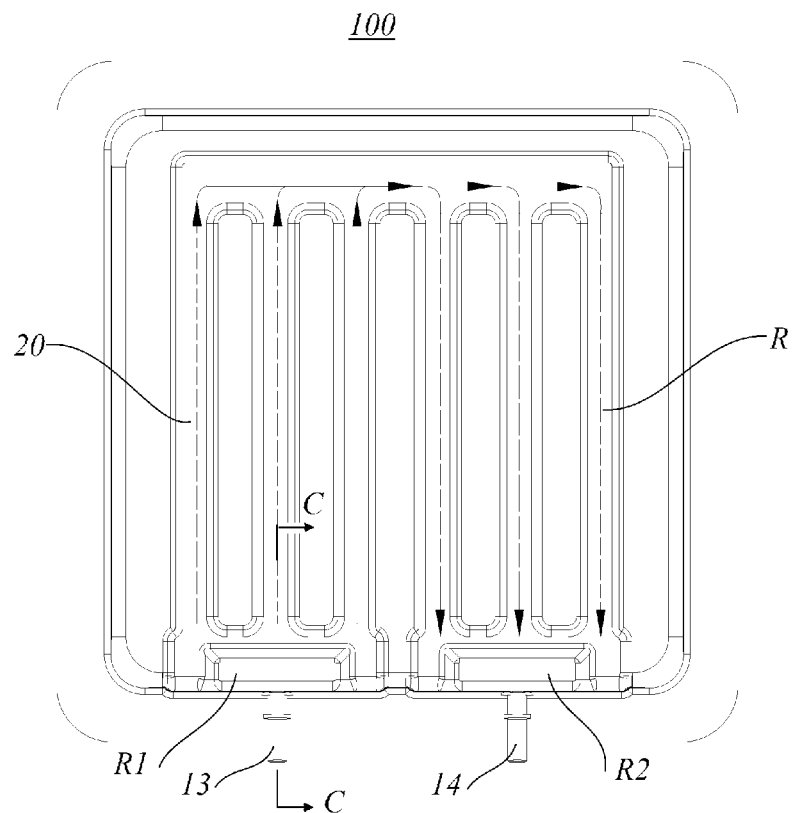
FIG. 6 is a schematic view showing a structure of a flow passage formed by a plurality of cavities in the casing shown in FIG. 3.
Figure 7:
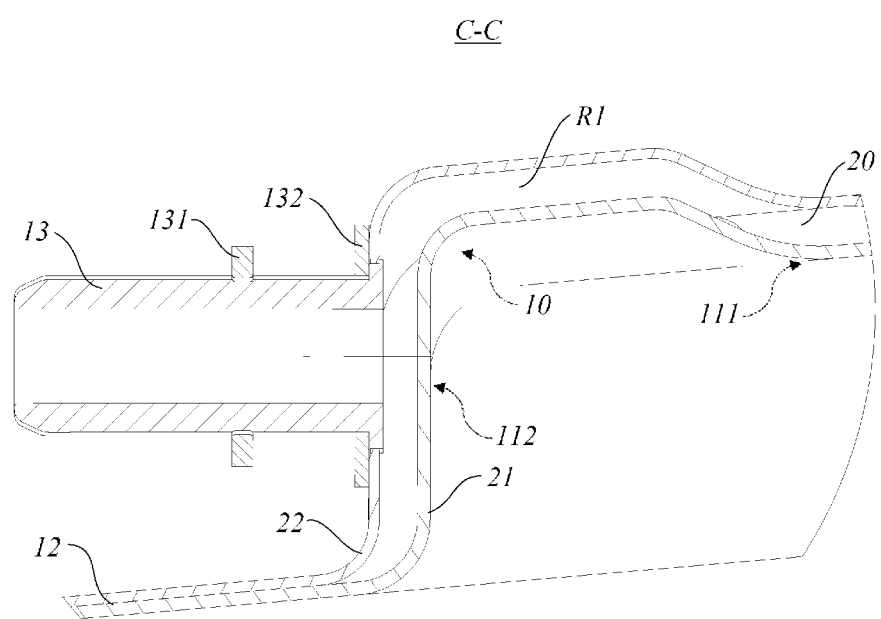
FIG. 7 is a cross-sectional view of the casing shown in FIG. 6 taken along the line C-C.

Referring to FIGS. 6 and 7 together, the plurality of cavities 20 formed in the bottom wall 111 are in communication with each other to form a flow passage R. An inlet pipe 13 and an outlet pipe 14 are disposed on the side wall 112 of the casing 1. The inlet pipe 13 and the outlet pipe 14 are in communication with two ends of the flow passage R, respectively, and are located on the same side of the side wall 112 to reduce an overall size of the casing 1. The inlet pipe 13 and the outlet pipe 14 are identical or similar in structure. Taking the inlet pipe 13 as an example to make an illustration, a mounting step 131 and a welding step 132 are disposed on the inlet pipe 13 and spaced apart from each other, wherein the inlet pipe 13 is fixed to the side wall 112 by the welding step 132, and is electrically connected to an external device via the mounting step 131.

As an optional embodiment, the plurality of cavities 20 may form a plurality of liquid inflow channels and a plurality of liquid return channels arranged side by side in the bottom wall 111. The plurality of liquid inflow channels and the plurality of liquid return channels are communicated with each other at one ends, and the plurality of liquid inflow channels are connected to the inlet pipe 13 at the other end while the plurality of liquid return channels are connected to the outlet pipe 14 at the other ends, to form a plurality of U-shaped flow passages in parallel. The thermal management of the entire battery assembly 2 can be performed by the phase change material or the cooling liquid in the flow passages.

In the situation that the cavities 20 are filled with the cooling liquid, one end of the inlet pipe 13 is connected to a cooling liquid input device, and an inflow confluence region R1 is formed in the wall portion 11 corresponding to the other end of the inlet pipe 13; and one end of the outlet pipe 14 is connected to a cooling liquid output device, and an outflow confluence region R2 is formed in the wall portion 11 corresponding to the other end of the outlet pipe 14, wherein the inflow confluence region R1 and the outflow confluence region R2 are isolated from each other to increase a flow rate of the cooling liquid in each flow channel. As shown in FIG. 7, the inflow confluence region R1 is a cavity 20 located between the side wall 112 and the bottom wall 111, which is formed between the first base plate 21 and the second base plate 22 by the blow molding process, and the inflow confluence region R1 is in communication with the plurality of liquid inflow channels arranged side by side. Similarly, the outflow confluence region R2 is a cavity 20 located between the side wall 112 and the bottom wall 111, which is formed between the first base plate 21 and the second base plate 22 by the blow molding process, and the outflow confluence region R2 is in communication with the plurality of liquid return channels arranged side by side. The cooling liquid is introduced into the inflow confluence region R1 via the inlet pipe 13, and then enters the respective liquid inflow channels arranged side by side along the arrows in FIG. 6. After that, the cooling liquid turns at the ends of the respective liquid inflow channels, enters the respective liquid return channels arranged side by side along the arrows in FIG. 6, and then converges at the outflow confluence region R2 at the ends of the respective liquid return channels. Finally, the cooling liquid discharges from the outlet pipe 14. Since the temperature of the cooling liquid gradually rises during the flow from the inlet pipe 13 to the outlet pipe 14, the portion of the casing 1 near the liquid inflow channels generally has a temperature difference from the portion of the casing 1 near the liquid return channels. Therefore, the above arrangement of the channels allows the temperature distribution of the battery assembly 2 to be relatively uniform.

In the situation that the cavities 20 are filled with the phase change material, the battery pack is further provided with a temperature control device to control a temperature of the phase change material. In the case that a temperature of the battery assembly 2 in the battery pack is lower than a lowest target temperature, the phase change material within the cavities 20 can be heated to change from a solid state to a liquid state, so that the phase change material can release heat and provide the heat to the battery assembly. Thus, the battery assembly 2 can be rapidly heated especially when the vehicle is parked in a cold environment. In the case that the temperature of the battery assembly 2 in the battery pack is higher than a highest target temperature, the temperature of the phase change material within the cavities 20 can be lowered such that the phase change material can absorb heat from the battery assembly 2 during transition from the liquid state to the solid state, thereby quickly removing the heat from the battery assembly 2. As a result, the temperature distribution of the entire battery assembly 2 can be uniform, and the thermal management of the battery assembly 2 can be improved.

Further, in the situation that the cavities 20 are filled with the phase change material, the plurality of liquid inflow channels and the plurality of liquid return channels arranged side by side may or may not in communication with each other.

It should be noted that the flow passage formed by the plurality of cavities 20 is not limited to the example shown in FIG. 6, and may be, for example, formed as an S-shaped flow passage, a hollow square shaped flow passage, or the like, and specifically, a path of the flow passage formed by the plurality of cavities 20 may be reasonably arranged depending on the configuration of the battery assembly 2 in the battery pack, and more details will not be described here.

Although the above description has been made with the cavities 20 formed in the bottom wall 111 as an example for convenience of description, it should be understood that the casing 1 according to the exemplary embodiments of the present disclosure is also applicable to a configuration in which the cavities 20 are formed in the side walls 112, and a configuration in which the cavities 20 are formed in both the bottom wall 111 and the side walls 112, and more details will not be described here.

Figure 8:
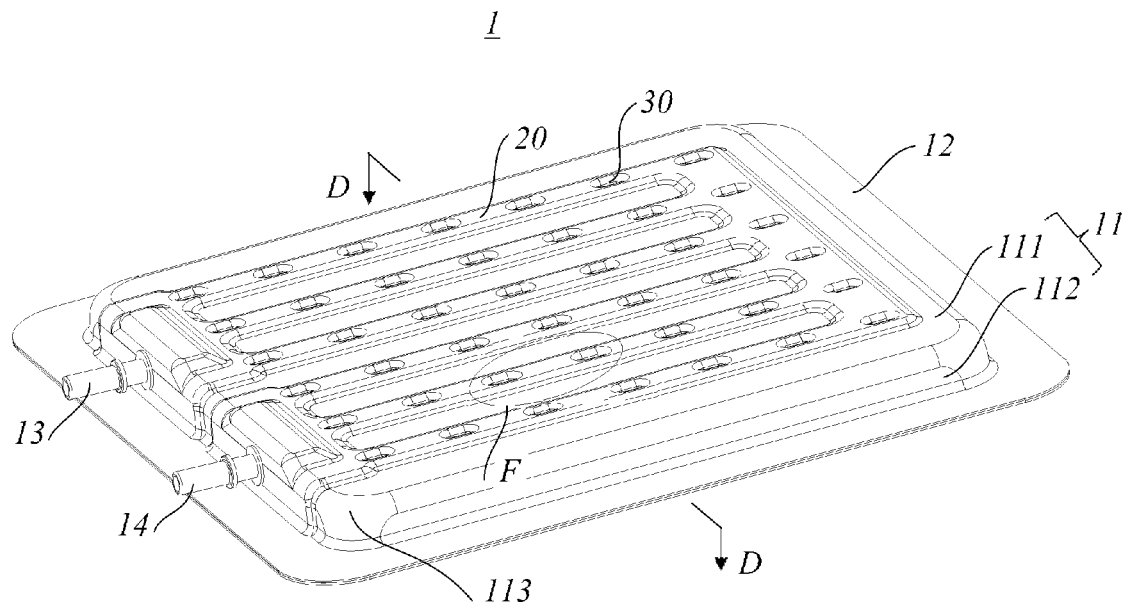
FIG. 8 is a schematic view showing a structure of another casing for the battery pack shown in FIG. 1.

Referring to FIG. 8, an embodiment of the present disclosure further provides a casing 1 for a battery pack, which has a similar configuration to the casing 1 as shown in FIG. 3, except that the cavity 20 is provided with an island 30 therein.

Figure 9:
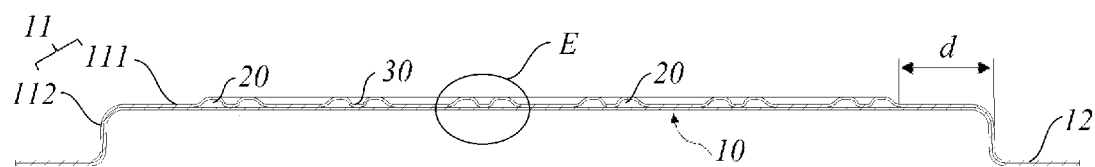
FIG. 9 is a cross-sectional view of the casing shown in FIG. 8 taken along the line D-D.

Referring to FIG. 8 and FIG. 9 together, the description will be made by taking a plurality of cavities 20 formed in the bottom wall 111 as an example. The plurality of cavities 20 in the bottom wall 111 are in communication with each other to form a flow passage R.

The wall portion 11 includes a first base plate 21 and a second base plate 22 which are stacked in a direction from the receiving space 10 to an exterior of the casing 1. The cavity 20 is formed by an outwardly projecting convex wall 221 of the second base plate 22 and a flat wall 211 of the first base plate 21 corresponding to the convex wall 221, and the island 30 is formed by recessing the convex wall 221 toward the flat wall 211. By disposing the convex wall 221 and the island 30 in opposite directions, the rigidity of the second base plate 22 and thus the bearing capacity of the casing 1 can be increased. Further, referring to FIG. 10, the convex wall 221 includes a top portion 2211 and a side portion 2212 connected with the top portion 2211. The top portion 2211 is planar or curved, there is a smooth transition between the top portion 2211 and the side portion 2212, and a portion of the convex wall 221 corresponding to the island 30 is attached to the flat wall 211. An external force acting on the convex wall 221 can be partially transmitted to the first base plate 21 via the island 30, which can further improve the impact resistance of the cavity 20 and of the casing 1, and meanwhile can increase a rate of finished products when molding the casing 1 and avoiding damage of the casing 1 due to distortion deformation of the cavity 20. Further, there is a smooth transition between a peripheral side of the island 30 and the convex wall 221, which can reduce a resistance experienced by the cooling liquid or the phase change material in a liquid state when flowing across the peripheral side of the island 30.

Further, when the cavity 20 has the island 30 disposed within it, the cavity 20 has a relatively reduced volume. In order to increase the volume of the cavity 20, a ratio of a height h of the cavity 20 to a width W of the cavity 20 can be set in a range of $h/W \leq 1$.

The plurality of cavities 20 are in communication with each other to form a flow passage R within which the island 30 is disposed. There may be multiple islands 30 arranged in one or more rows in a length direction of the flow passage R. The multiple islands 30 can effectively enhance a pressure resistance of the cavities 20, and can ensure that a plurality of turbulences are formed by the cooling liquid or the phase change material in the liquid state flowing through the flow passage formed by the cavities 20, which can make the temperature distribution of the wall portion 11 more uniform, and increase the heat exchange efficiency of the battery assembly 2.

Referring to FIG. 9, a portion of the island 30 attached to the flat wall 211 is formed in a shape of strip or ellipse, and a long side of the strip or a major axis of the ellipse is parallel to the length direction of the flow passage R. During the blow molding process, a medium moves along the length of the flow passage R. By disposing the long axis of the island 30 along the length direction of the flow passage R, a rate of finished products when molding the flow passage R can be increased. Besides, the stripped or elliptical shape of the island 30 can relatively increase a contact area between the island 30 and the first base plate 21, thereby avoiding deformation of the island 30 during the blow molding process.

Preferably, a ratio of a length L of the island 30 to a width W1 of the island 30 is in a range of $2 \leq L/W1 \leq 5$, wherein the length L is in a range of 5 mm$\leq$L$\leq$15 mm. If the length or width of the island 30 is too large, a flow resistance in the cavity 20 will be increased, and if the length or width of the island 30 is too small, the cavity 20 will be easily broken during the blow molding process, or a structural strength of the cavity 20 will be insufficient.

Figure 10:
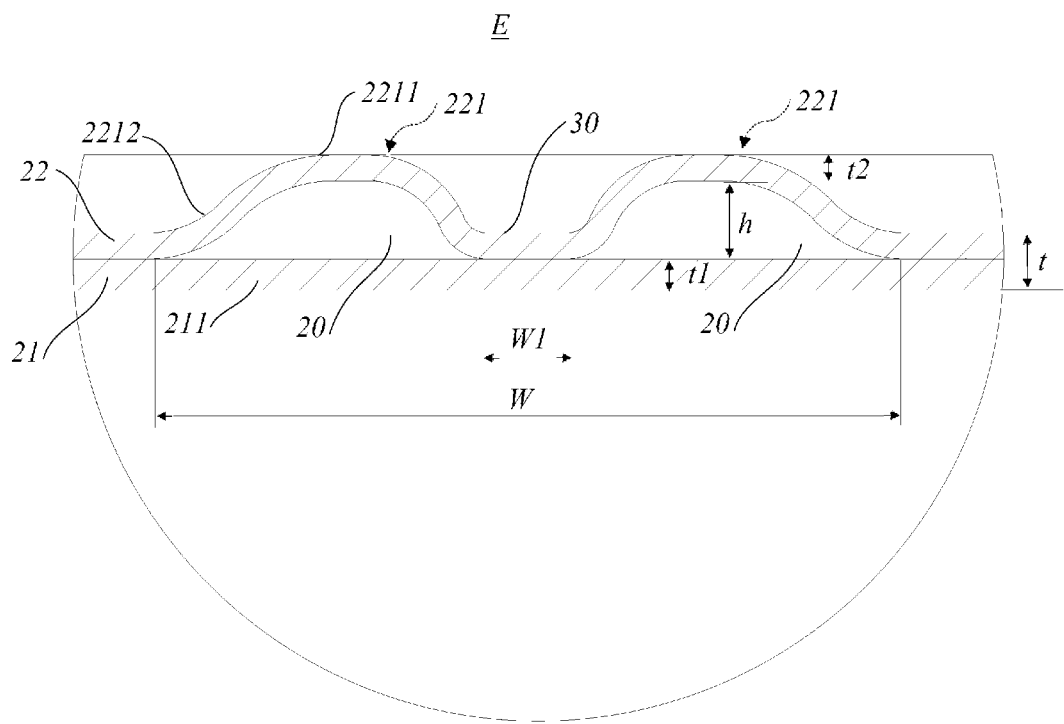
FIG. 10 is an enlarged schematic view showing a structure of the region E in the cross-sectional view shown in FIG. 9.
Figure 11:
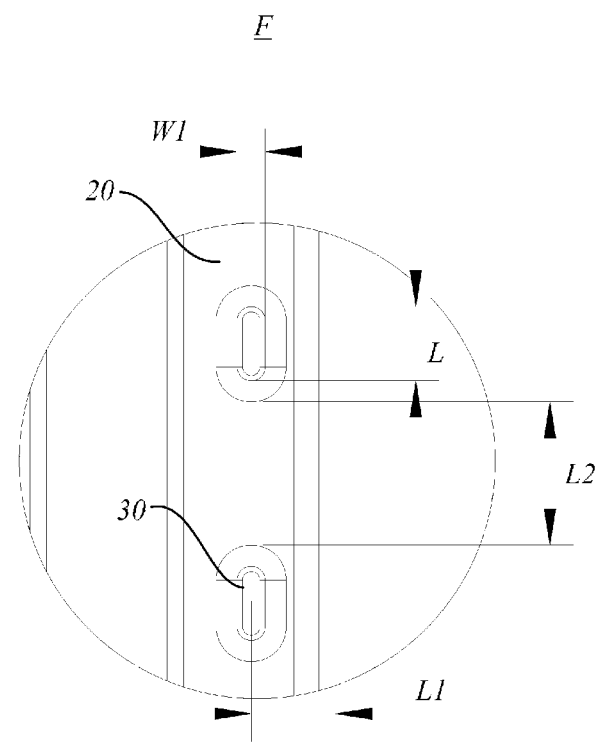

A first space L1 is defined as a distance from a center of the island 30 to one side of the cavity 20, and the first space L1 is equal to or greater than the width W1 of the island 30. When the multiple islands 30 are arranged in two or more rows in the length direction of the flow passage R (that is, there may be two or more islands 30 spaced apart from each other in a direction perpendicular to the length direction of the flow passage R in a certain cross section of the cavity 20, compared to the case that there is only one island in the cross section of one cavity 20 as shown in FIG. 10), a distance between the centers of the islands 30 in two adjacent rows can be defined as a third space L3, and a distance from a center of the island 30 closest to a side of the cavity 20 to the side of the cavity 20 can be regarded as the first space L1, wherein $L3 \geq W1$ and $L1 \geq W1$. If $L1 < W1$ or $L3 < W1$, the cavity 20 will be easily broken during the blow molding process.

A second space L2 is defined as a distance between two adjacent islands 30 in each row in the length direction of the flow passage R. Preferably, the second space L2 is equal to or greater than the first space L1, and if the second space L2 is smaller than the first space L1, the cavity 20 will be easily broken during the blow molding process.

By providing the islands 30 in the plurality of cavities 20 in the wall portion 11, the casing 1 for a battery pack provided by the embodiments of the present disclosure can not only improve the structural strength of the casing 1 and of the cavities 20, but also can change a flow capacity and a flow rate of the fluid in the cavities 20, which can make the temperature distribution of the wall portion 11 more uniform, increase the heat exchange efficiency of the battery assembly 2, and further improve the thermal management of the battery pack.

Referring again to FIG. 2, the casing 1 for the battery pack according to any of the above-mentioned embodiments includes a support member 15 fixed to the bottom wall 111. The support member 15 is provided with a plurality of threaded holes, and a fixing frame of the battery assembly 2 is provided with through holes. The battery assembly 2 can be fixed in the receiving space 10 by passing screws through the threaded holes and the through holes. The cover 3 can close the opening of the casing 1 to form an enclosed space for accommodating the battery assembly 2 together with the receiving space 10 of the casing 1.

In order to further improve the thermal management of the battery assembly 2, a thermal conductive adhesive can be applied between an inner surface of the bottom wall 111 and the battery assembly 2, to allow heat to be rapidly transferred between the battery assembly 2 and the cavities 20.

The casing 1 further includes a protective member 16, which is kept away from the cavities 20 and fixed at an edge of the casing 1, to support the entire casing 1 and protect the cavities 20 from being damaged by external components. Also, the battery pack can be fixed to the vehicle or other components via the protective member 16.

Further, the embodiments of the present disclosure further provide a battery pack comprising a casing 1 according to any one of the embodiments as described above, in which the heat exchange efficiency of the battery assembly 2 can be increased and the thermal management can be improved.

Although the present disclosure has been described with reference to the preferred embodiments, various modifications may be made to the present disclosure and components may be replaced with equivalents without departing from the scope of the present disclosure. In particular, the technical features mentioned in the various embodiments can be combined in any manner as long as there is no structural conflict. The present disclosure is not limited to the specific embodiments disclosed herein, but includes all technical solutions falling within the scope of the claims.

What is claimed is:

1. A casing for a battery pack, wherein the casing has a receiving space and an opening in communication with the receiving space, the receiving space is formed by a wall portion of the casing, and the wall portion is formed from two or more stacked base plates, between which a plurality of cavities are formed,
    wherein the base plates comprises a first base plate and a second base plate, and the cavity is formed by an outwardly projecting convex wall of the second base plate and a flat wall of the first base plate corresponding to the convex wall,
    wherein the flat wall has a wall thickness t1 and the cavity has a height h in a range of $h \leq 5 \times t1$.

2. The casing according to claim 1, wherein the first base plate and the second base plate are stacked in a direction from the receiving space to an exterior of the casing.

3. The casing according to claim 1, wherein the convex wall comprises a top portion and a side portion connected to the top portion, wherein the top portion is planar or curved, and there is a smooth transition between the top portion and the side portion.

4. The casing according to claim 1, wherein the wall portion has a wall thickness t in a range of 1 mm$\leq t \leq$6 mm.

5. The casing according to claim 1, wherein a ratio of a wall thickness t1 of the flat wall to a wall thickness t2 of the convex wall is in a range of $0.5 \leq t2/t1 \leq 1$.

6. The casing according to claim 1, wherein a ratio of the height h to a width W of the cavity is in a range of $h/W \leq 0.5$.

7. The casing according to claim 1, wherein the wall portion comprises a bottom wall and side walls surrounding the bottom wall on a peripheral side of the bottom wall, and the bottom wall and the side walls are integrally formed.

8. The casing according to claim 7, wherein a minimum distance d from an intersection line between two adjacent side walls to the cavity is equal to or greater than 25 mm.

9. The casing according to claim 7, wherein the plurality of cavities are in communication with each other to form a flow passage.

10. The casing according to claim 9, wherein the casing is provided with an inlet pipe and an outlet pipe on one of the side walls, wherein the inlet pipe and the outlet pipe are respectively in communication with two ends of the flow passage, and are located at a same side of the side wall.

11. The casing according to claim 1, wherein a material of the base plate has a tensile strength $\sigma \geq 100$ MPa, and has an elongation at break $\geq 12\%$.

12. The casing according to claim 11, wherein the material of the base plate has an elongation at break $\geq 20\%$.

13. The casing according to claim 1, wherein the cavities are formed between the first base plate and the second base plate by a blow molding process.

14. A battery pack, comprising:
    a battery assembly;
    a casing having a receiving space and an opening in communication with the receiving space, the receiving space is formed by a wall portion of the casing, and the wall portion is formed from two or more stacked base plates, between which a plurality of cavities are formed; and
    a cover closing the opening of the casing to form an enclosed space for accommodating the battery assembly together with the receiving space of the casing,
    wherein the base plates comprises a first base plate and a second base plate, and the cavity is formed by an outwardly projecting convex wall of the second base plate and a flat wall of the first base plate corresponding to the convex wall,
    wherein the flat wall has a wall thickness t1 and the cavity has a height h in a range of $h \leq 5 \times t1$.

15. The battery pack according to claim 14, wherein the first base plate and the second base plate are stacked in a direction from the receiving space to an exterior of the casing.

16. The battery pack according to claim 14, wherein the convex wall comprises a top portion and a side portion connected to the top portion, wherein the top portion is planar or curved, and there is a smooth transition between the top portion and the side portion.

17. The battery pack according to claim 14, wherein the wall portion has a wall thickness t in a range of 1 mm$\leq t \leq$6 mm.

18. The battery pack according to claim 14, wherein a ratio of a wall thickness t1 of the flat wall to a wall thickness t2 of the convex wall is in a range of $0.5 \leq t2/t1 \leq 1$.

19. The battery pack according to claim 14, wherein a ratio of the height h to a width W of the cavity is in a range of $h/W \leq 0.5$.

20. The battery pack according to claim 14, wherein the wall portion comprises a bottom wall and side walls surrounding the bottom wall on a peripheral side of the bottom wall, and the bottom wall and the side walls are integrally formed.

* * * * *